July 2, 1963      H. HUBBELL ETAL      3,096,409
SWITCH PLATE LOCKING COVER ATTACHMENT
Filed June 14, 1960      3 Sheets-Sheet 1
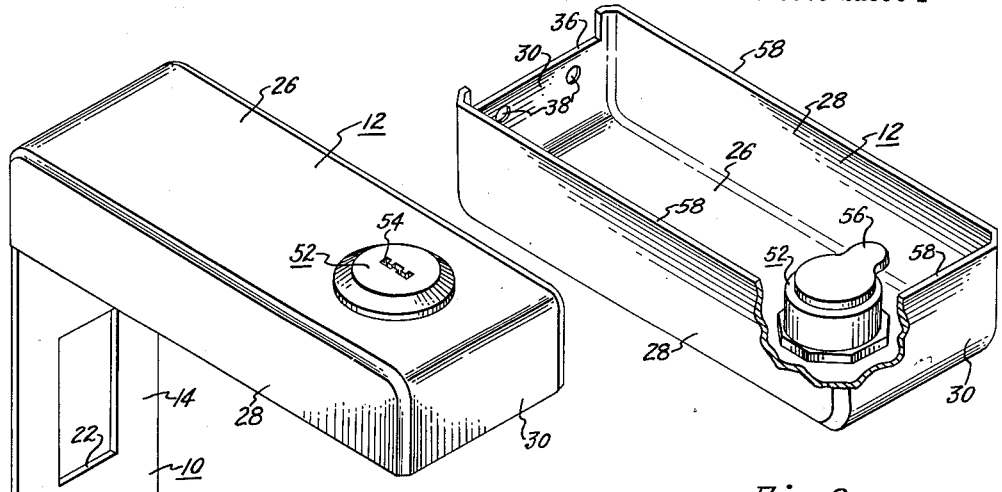
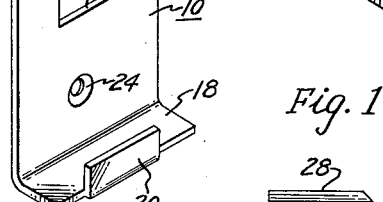
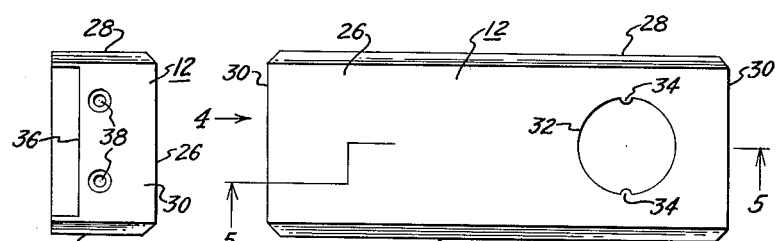
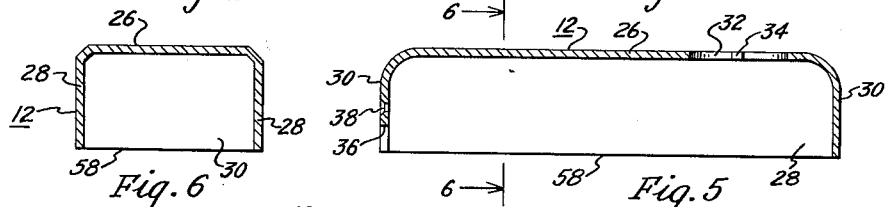
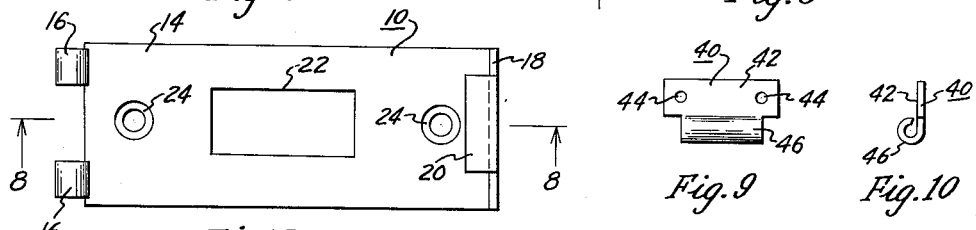
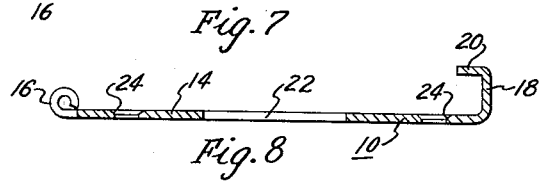
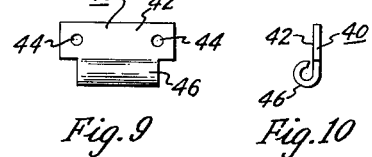
INVENTORS
Harvey Hubbell &
BY Joseph F. Healy
Wooster, Davis & Cifelli
ATTORNEYS July 2, 1963

H. HUBBELL ETAL 3,096,409

SWITCH PLATE LOCKING COVER ATTACHMENT

Filed June 14, 1960

INVENTORS
Harvey Hubbell &
BY Joseph F. Healy
Wooster, Davis & Cifelli
ATTORNEYS July 2, 1963  H. HUBBELL ETAL  3,096,409
SWITCH PLATE LOCKING COVER ATTACHMENT
Filed June 14, 1960  3 Sheets-Sheet 3

INVENTORS
Harvey Hubbell
Joseph F. Healy
BY Worster, Davis & Cifelli
ATTORNEYS

United States Patent Office 3,096,409
Patented July 2, 1963

3,096,409
SWITCH PLATE LOCKING COVER ATTACHMENT
Harvey Hubbell, Southport, and Joseph F. Healy, Westport, Conn., assignors to Harvey Hubbell, Incorporated, Bridgeport, Conn., a corporation of Connecticut
Filed June 14, 1960, Ser. No. 35,979
5 Claims. (Cl. 200—44)

This invention relates generally to electrical switches of the manually actuated, wall type widely utilized in buildings, and particularly to an attachment therefor which renders the manually actuable switch operating means of such electrical switches capable of being made inaccessible so as to prevent their operation by unauthorized persons.

The unauthorized operation of manually actuated electrical switches is a problem in many environments. In a house it is a common experience to have children "play" with electrical switches, as by snapping or pushing them "on" and "off." Although this does not significantly shorten the life of these switches, though it does somewhat, it is principally an annoyance to the occupants of the house, for example, if they are attempting to listen to the radio. In public and quasi-public buildings, such as schools, hotels, apartment houses, hospitals, stores, penal institutions and the like, it is not only an annoyance to have unauthorized persons operate the electrical switches in such buildings, but in some instances it constitutes a series problem. Under certain circumstances, as when large groups of people are moving about, it is actually a safety hazard to have these electrical switches operated by unauthorized persons, and in other instances it is contrary to maintenance of discipline or it is, at the very least, an economic waste to have electrical lights and other equipment left "on" by unauthorized persons when they should be turned "off."

It is an object of this invention to provide an attachment for existing electrical switches of the manually actuated, wall type which renders such switches capable of positive control, in that they can be rendered inaccessible to unauthorized persons.

It is another object of the invention to provide such an attachment which is inexpensive to manufacture, which may be used with widely existing electrical switches, and which does not require the services of an electrician to install.

It is still another object of the invention to provide such an attachment which may be set for utilization either to render the electrical switch accessible or inaccessible for operation.

It is a further object of the invention to provide such an attachment which is particularly designed for use with "toggle type" electrical switches, i.e. having a manually actuated toggle switch operating member, and which renders such switches absolutely tamper-proof, even if unauthorized attempts are made to operate the toggle member as by utilizing sharp instruments, such as knife blades or nail files and the like, when the attachment is operatively associated with such a switch to render the toggle member inaccessible.

Some of the objects of the invention are achieved in one form by providing an attachment that includes a mounting member that is constructed to be secured to an existing, standard, electrical switch face plate by utilization of the existing face plate mounting screws, and which includes a movable cover that is constructed and structurally associated with the attachment mounting member in such a manner that it may be locked in closed position relative thereto so as to surround and overlie the switch operating means of the switch and thereby render it inaccessible.

Some of the other objects of the invention are achieved in another form by providing a supplemental means on the attachment cover which cooperates with the toggle member of a standard, toggle type switch so as to render its toggle member totally unactuable when the cover is disposed in closed condition relative to the attachment mounting member, even though unauthorized attempts are made to insert sharp instruments such as knife blades or nail files between the mounting member and the cover to actuate the toggle member.

The above and other objects and further details of that which we believe to be novel, unobvious and our invention will be clear from the following description and claims taken with the accompanying drawings, wherein:

FIG. 1 is a front perspective view of one form of attachment that incorporates the invention showing the attachment cover in its pivoted open position relative to the attachment mounting member;

FIG. 2 is a rear perspective view of the attachment cover showing the interior thereof with portions broken away to more clearly show the portion of the attachment cover lock that is disposed on the inside of the attachment cover;

FIG. 3 is a front elevational view of the attachment cover with the attachment cover lock removed;

FIG. 4 is an end elevational view thereof looking in the direction of the arrow in FIG. 3;

FIG. 5 is a sectional view taken substantially on line 5—5 of FIG. 3;

FIG. 6 is a sectional view taken substantially on line 6—6 of FIG. 5;

FIG. 7 is a front elevational view of the attachment mounting member;

FIG. 8 is a sectional view taken substantially on line 8—8 of FIG. 7;

FIG. 9 is a plan view of a hinge member that is secured to the attachment cover when the attachment is fully assembled;

FIG. 10 is an end elevational view thereof;

Figure 11:
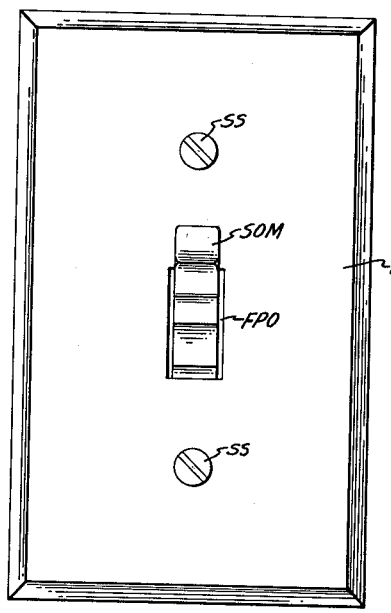
FIG. 11 is a front elevational view of an exemplary, existing, standard electrical switch of the toggle type with a standard switch face plate with which our locking attachments may be utilized.

Referring to the drawings, one form of the invention is illustrated in FIGS. 1 to 16. In FIG. 1, a switch plate locking cover attachment constructed in accordance with this form of the invention is illustrated by itself, and it generally comprises a mounting member 10 and a cover 12 which are selectively pivotally secured to each other by a hinge arrangement in a manner to become apparent subsequently. The mounting member 10 as can best be seen in FIGS. 7 and 8, comprises a formed plate, preferably of sheet metal, that includes a generally rectangular planar mounting portion 14 having at one end a pair of spaced, aligned, tubular hinge-pin receiving portions 16, that may be conveniently bent out of projections on the mounting portion, and at its other end a locking portion that is bent generally at a right angle to the mounting portion 14 and has its free extremity 20 bent backwardly over the mounting portion and of a reduced width to form a locking lug. Centrally of the mounting portion 14 there is formed a rectangular opening 22, and near each end of the mounting portion there is formed a countersunk opening 24.

The attachment cover 12, which is illustrated by itself in FIGS. 3–6, comprises a generally rectangular, open-sided, box-like metallic structure and it includes a generally rectangular, planar, front wall 26, a pair of spaced, parallel side walls 28, and a pair of spaced, parallel end walls 30 connecting the side walls and front wall. In the front wall 26 near one end thereof there is formed a generally circular opening 32 having a pair of spaced, inwardly directed, lock positioning tabs 34. One of the end walls 30 has a notch 36 cut out of it and a pair of spaced, countersunk openings 38 formed in it adjacent an edge of the notch.

The attachment cover 12 is pivotally secured to the mounting member 10 by a hinge arrangement including hinge member 40 having a flat mounting portion 42 with spaced openings 44 formed therein and centrally at one edge a tubular, hinge-pin receiving portion 46 that may be conveniently bent out of a projection on the portion 42. The hinge member 40 is rigidly and permanently secured to the end wall 30 of the attachment cover having notch 36 formed therein, as by having securing means, such as rivets 48 extending through openings 38 in the cover end wall and openings 44 in the hinge member 40, as can best be seen in FIGS. 13 and 14. When the hinge member 40 is rigidly secured to the attachment cover end wall, its tubular, hinge-pin receiving portion 46 is partially disposed in the notch 36. To pivotally secure the attachment cover 12 and the mounting member 10, the hinge pin 50 is disposed to extend within the hinge-pin receiving portions 16 of the mounting member and the hinge-pin receiving portion 46 of the hinge member 40 after these hinge-pin receiving portions are aligned. After being fully mounted, the hinge-pin 50 is firmly secured in the portions 16 and mounted in portion 46 so as to permit relative movement. Therefore, the central portion of hinge-pin 50 constitutes a pivot pin for portion 46, hinge member 40 and the entire attachment cover which permits the latter to be selectively pivoted relative to the attachment mounting member 10.

Rigidly secured to the front wall 26 of the attachment cover is a cylinder type lock 52 which may be of any desired conventional construction. Lock 52 is preferably of the type that is key-actuated so as to operate in a one-quarter turn manner. Lock 52 is mounted so as to be disposed in opening 32 of front wall 26 and be positioned by tabs 34. Key slot 54 of the lock is accessible from the front side of front wall 26 and on the interior of attachment cover 12 there is disposed a locking detent 56 which is constructed so as to be rotatable one-quarter of a turn between the dotted and dot-dash lines illustrated in FIG. 12. The locking detent 56 cooperates with the locking lug 20 on the mounting member 10 to form means that is partially on the attachment cover and partially on the attached mounting member for permitting locking of the cover to the mounting member.

The form of the invention illustrated in FIGS. 1–16 and described thus far is capable of being assembled for operative use in association with a variety of existing, standard wall-type switches with a minimum amount of effort and without requiring the services of an electrician. In FIG. 11 there is illustrated the exposed portions at the front of an existing, standard, manually actuated, wall, toggle-type switch and its covering face plate. It should be clearly understood that with the first form of the invention, the switch does not have to be of the toggle type, and may be other types of manually operated switches, such as "push" type switches. The switch face plate FP illustrated is a standard face plate having a central rectangular opening FPO through which a conventional, manually actuated, switch-operating member SOM extends and is accessible to a person for manual actuation. The illustrated switch-operating member is in the form of a toggle switch of known construction; however, as pointed out above it may be of other types. The face plate FP is secured to the switch (not shown) by a pair of standard, face plate securing screws SS that are mounted in the usual manner.

In FIGS. 12 to 16, the switch plate locking cover attachment contemplated by the first form of the invention is illustrated in operative condition in structural association with an existing switch of the type illustrated in FIG. 11. Disregarding the attachment for the moment, it will therein be seen that the standard face plate FP is mounted in a conventional manner by the screws SS which extend through appropriate openings in the face plate and are received and anchored in appropriate openings in the conventional switch mounting yoke Y. The electrical switch S, which may be of any convenient known construction, is mounted by the yoke Y in a conventional manner, as by having the yoke ears E secured to conventional wall box mounting tabs T, as by screws YS. It will be understood that the screws SS in existing, standard, wall switch mountings secure a standard face plate to a switch in such a manner as to cover the usual wall opening in which the switch is mounted, to thereby provide an attractive mounting. It will also be understood that the usual switch-operating member extends through an opening in the face plate where it is accessible and may be conveniently actuated manually.

Figure 13:
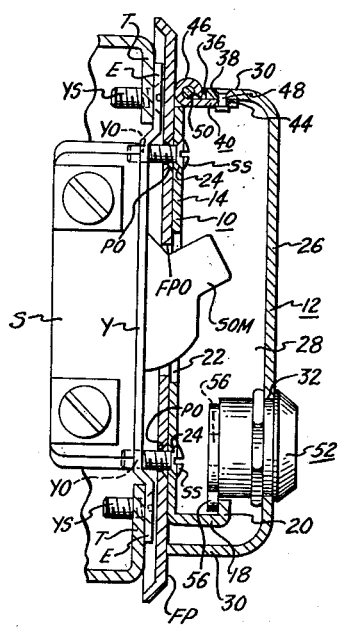
FIG. 13 is a sectional view taken substantially on line 13—13 of FIG. 12.
Figure 14:
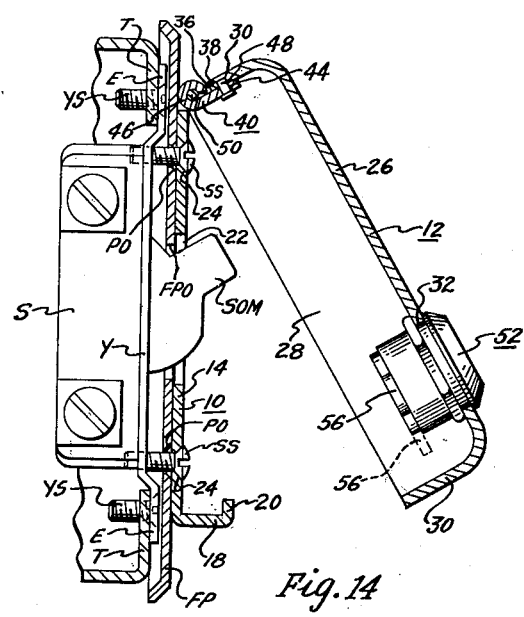
FIG. 14 is a sectional view similar to FIG. 13 except that the attachment cover is illustrated in an open position.
Figure 15:
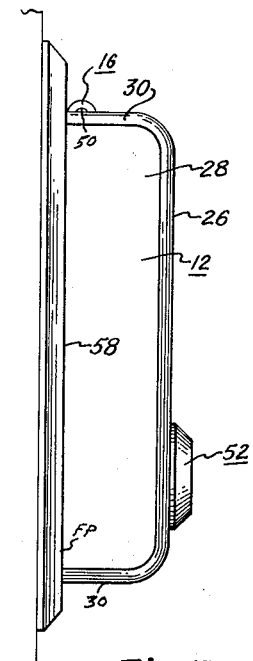
FIG. 15 is a side elevational view looking in the direction of the arrow in FIG. 12.
Figure 16:
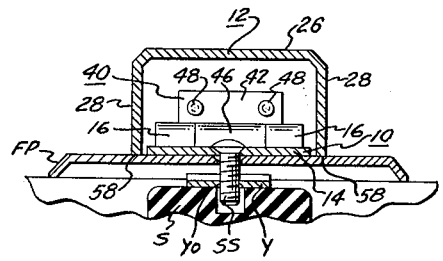
FIG. 16 is a sectional view taken substantially on line 16—16 of FIG. 12.

In FIGS. 13 and 14, the securing screws SS are illustrated as also securing and mounting the switch plate locking cover attachment to the face plate FP. This is effectuated simply by removing the existing face plate securing screws SS from an existing, standard wall type switch assembly and inserting them through the countersunk openings 24 formed in the attachment mounting member portion 14 before inserting them through the usual openings PO in the face plate FP and the usual openings YO in the yoke Y in which they are anchored. It will, therefore, be apparent that in order to mount the attachment it is simply necessary to remove the usual screws SS, juxtapose the attachment mounting member portion 14 so as to be parallel to and contiguous with the front side of face plate FP, and then insert through openings 24, PO and YO, and tighten, the securing screws SS.

When the switch plate locking cover attachment is operationally mounted and secured to the face plate FP, the switch operating member SOM, which is a toggle member as illustrated, extends through the opening 22 in the attachment mounting member 10 (see FIGS. 13 and 14). When the attachment is so mounted, the major length of the attachment extends vertically (see FIG. 12). When the attachment cover is in its closed position shown in FIGS. 12, 13, 15 and 16, the attachment cover 12 is disposed relative to the attachment mounting member 10 and the switch operating member SOM so as to completely cover, i.e. surround and overlie, these elements and render them inaccessible from the front of the switch. The attachment cover 12 may be selectively locked in its closed position by utilizing the lock 52. In order to close and lock the attachment cover it is necessary to insert a key in the key slot 54 and turn it to move the locking detent 56 to the position shown in full lines in FIG. 14, dotted lines in FIG. 13, and dot-dash lines in FIG. 12. The attachment cover 12 may then be pivoted, for example, from its open FIG. 14 position toward the face plate FP and to its FIG. 13 position. Turning of the key in the opposite direction results in rotating the locking detent 56 one-quarter turn to its position shown in solid lines in FIG. 13 and dotted lines in FIGS. 12 and 14. In this position, the locking detent 56 is disposed on the side of the locking lug 20 which faces the face plate FP, and therefore, the attachment cover cannot be pivoted outwardly to its open position. It should be carefully noted that when in the locked, closed condition, the free edges 58 of the cover are flush, i.e. contiguous, with the front side of the face plate FP and extend around the attachment mounting member 10. In this condition, the attachment cover is securely locked with its free edges 58 firmly seated against the front side of the face plate and the switch-operating member SOM and face plate mounting screws SS completely covered from the front of the switch and rendered inaccessible, thereby preventing unauthorized actuation of the switch-operating member or the removal of the attachment. The only practical way to have access to the switch-operating member SOM when the attachment is mounted in closed, locked condition is to have a key to the lock 52.

Figure 12:
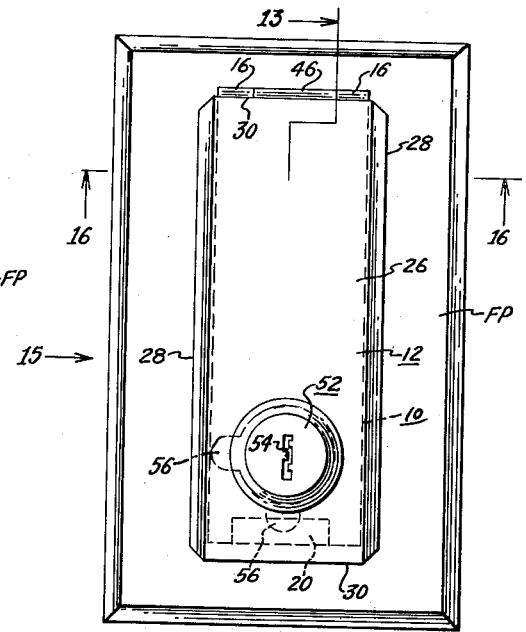
FIG. 12 is a front elevational view of the FIGS. 1–10 form of attachment operatively associated with the FIG. 11 switch in locked closed condition relative thereto.

When it is desired to have access to the switch-operating member SOM, it is simply necessary to insert the key into the key slot 54 and to move the locking detent 56 one-quarter turn from its locking position, shown in solid lines in FIG. 13 and dotted lines in FIGS. 12 and 14, to its unlocking position, shown in dotted lines in FIG. 13, dot-dash lines in FIG. 12 and solid lines in FIG. 14. It will be apparent that when in unlocking position, the locking detent 56 is clear of the locking lug 20 on the attachment mounting member, and therefore, the attachment cover 12 may be pivoted outwardly and upwardly away from the face plate FP and attachment mounting member 10 to the open (FIG. 14) position. When in this position, the switch-operating member SOM may be actuated manually as desired, and the attachment cover 12 returned to its closed (FIG. 13) position and locked in the manner set forth above. It will, therefore, be observed that an extremely effective, relatively inexpensive attachment is provided by this form of the invention, which operates to provide a locked cover for existing switch-operating members and which may be readily secured to existing, standard, wall-type switches by utilizing existing, standard, face plate securing screws and without requiring the services of an electrician.

If desired, the attachment described thus far may be utilized so as to be unlocked in open condition at all times. In order to effect this operation, it is simply necessary to move the attachment cover to its FIG. 14 position and then turn the key so as to move the locking detent 56 to its locking position (dotted position shown in both FIGS. 12 and 14) while the attachment cover 12 is in its open position. Removal of the key and pivoting of the attachment cover 12 toward its closed position will result in the locking detent 56 engaging the front side of the locking lug 20. When in this condition, the attachment cover 12 will give the appearance of being closed and locked; however, it will not be locked and it may be swung outwardly as desired to actuate the switch operating member. It will, therefore, be apparent that the attachment may be utilized to lock the attachment cover and to thereby require operation of the lock to effect unlocking and opening of the attachment cover, or it may be utilized so as not to require the operation of the lock.

Figure 17:
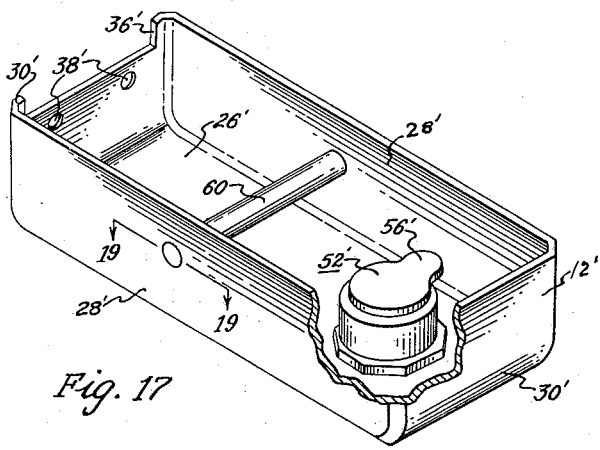
FIG. 17 is a rear perspective view of a modified attachment cover of another form of the invention.
Figure 18:
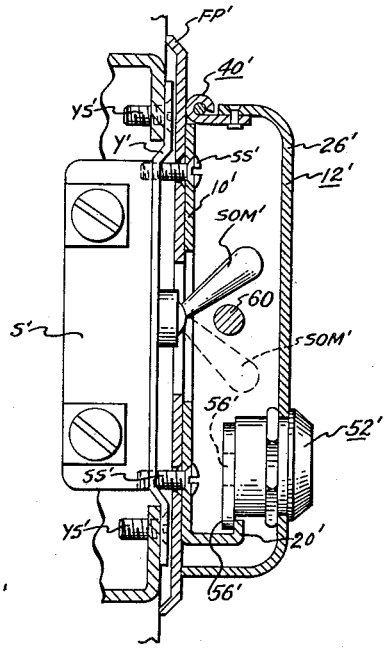
FIG. 18 is a vertical sectional view, similar to FIG. 13, but of the other form of the invention shown operatively associated with a toggle type switch.
Figure 19:
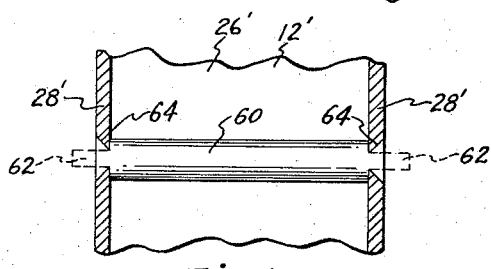
FIG. 19 is a fragmentary sectional view of the modified attachment cover taken substantially on line 19—19 of FIG. 17.

In FIGS. 17–19 there is illustrated another form of the invention, which is generally similar to the first form, but which is particularly well suited for use with a manually actuated toggle switch and wherein when so used, tampering and unauthorized operation of the switch is absolutely prevented. Although the FIGS. 1–16 form of the invention is substantially tamper-proof, principally by virtue of the fact that the attachment cover extends substantially completely around the attachment mounting member (see FIG. 16) and has edges which are flush with the switch face plate, it might be possible if the attachment were improperly mounted, or if the attachment parts became damaged and loosened, that someone might be able to insert a sharp instrument, such as a nail file or knife blade, between the face plate and the attachment mounting member or between the attachment mounting member and the attachment cover to operate the switch. Such a condition would not normally be encountered with the FIGS. 1–16 form of the invention; however, in order to completely eliminate any remote possibility of this occurring, the FIGS. 17–19 form of the invention has been devised.

The construction, mounting and operation of the FIGS. 17–19 form of the invention is substantially the same as that of the first form, and therefore, with the exception of parts which are different, similar reference characters with a prime added are utilized in FIGS. 17–19 to designate corresponding parts to those of the first form. The only real structural difference in the two forms of the invention resides in the provision of a transverse extending member 60, in the form of a bar or pin, that is rigidly secured to the side walls 28' of the cover 12'. The extending member 60 is disposed so as to be located when the attachment is mounted on an existing, standard, wall-type, toggle switch, as shown in FIG. 18, so as to occupy a position adjacent to the switch-operating member SOM' that is somewhat intermediate between the two extreme positions between which the toggle type, switch-operating member SOM' is "toggled," i.e. snapped manually, and in a position to positively obstruct snapping of the toggle member from one of its positions to the other. It will, therefore, be apparent that even if a nail file or knife blade were capable of being inserted within the attachment so as to contact the switch-operating member SOM', it would be impossible to actuate it, because the extending member 60 would prevent such actuation.

In FIG. 19 there is illustrated one manner in which the extending member 60 may be secured to the attachment cover 12'. The extending member 60 may originally take the form of a rod-like bar or pin having opposite extending reduced diameter portions 62 (shown in dotted lines) that extend through countersunk openings 64 in the side walls 28' of the attachment cover. The free ends of the portions 62 may be upset and the metal of which they are made displaced so as to assume the full line, final configuration to fill the countersunk openings 64 and thereby rigidly mount the extending member 60 to the attachment cover.

It will, therefore, be apparent that applicants have provided attachments which satisfy all of the objects of the invention. It should be particularly noted that the simple, inexpensive, effective attachments contemplated by our invention may be utilized with widely existing standards, wall-type switch assemblies, and do not require the services of an electrician to install. They are versatile in that they may be utilized for locking operation or left unlocked, and be utilized with either standard single switch or multi-gang installations. It is not necessary to install new switch face plates when installing these attachments, unless an exact matching finish is desired between the finishes of the face plate and the attachment. In this regard, the attachments can be finished with any desired feasible finish, standard or special. Groups of these attachments may have locks that are opened, by one key, by different keys on different lock set-ups, or by a master key on different lock set-ups. In view of the logical use of large groups of these attachments in public and quasi-public buildings, it is believed that the master key arrangement will be most efficient in such applications. On the other hand, when used in a private one-family dwelling, the single key arrangement may be preferred. In multi-family dwellings, such as apartment houses, it may be preferable to have different locks-different keys arrangements for each apartment.

As will be evident from the foregoing description, certain aspects of our invention are not limited to the particular details of construction of the examples illustrated, and we contemplate that various and other modifications and applications will occur to those skilled in the art. It is, therefore, our intention that the appended claims shall cover such modifications and applications as do not depart from the true spirit and scope of our invention.

What we claim as new and desire to secure by Letters Patent of the United States is:

1. For use with an electrical wall-type switch having a standard face plate which is mounted by standard face plate securing screw means and through which a manually actuated switch operating member extends that is accessible for manual actuation, an attachment adapted to be mounted in operative association with the switch for selectively rendering the switch operating member inaccessible to prevent unauthorized manual actuation thereof comprising: a generally planar mounting member having an opening through which the switch operating member may extend and opening means formed therein and arranged to have the standard face plate securing screw means extend therethrough to rigidly mount said mounting member to the front of the standard face plate in contiguous parallel relationship therewith with the switch operating member extending through said opening and accessible for actuation; and a cover pivotally secured to said mounting member between an opened and a closed position by hinge means formed partially on and disposed at adjacent end portions of said mounting member and said cover, said cover configured such that when in opened position it does not prevent access to the switch operating member and when in closed position it overlies and surrounds the portion of the switch operating member that extends through the face plate and mounting member and renders it inaccessible for actuation; and selectively operated locking means for locking said cover in its closed position disposed at adjacent end portions of said mounting member and said cover that are opposite to the first mentioned adjacent end portions, said locking means comprising a locking lug formed out of said mounting member and extending inwardly of said cover when the latter is in closed position and a manually key-operated lock carried by said cover and having a latching detent that is arranged to selectively engage and disengage said locking lug to either lock or unlock said cover relative to said mounting member.

2. An attachment as defined in claim 1 wherein said cover and said mounting member are configured and dimensioned such that said cover substantially completely overlies and surrounds said mounting member and has peripheral edge portions in contact with the face plate when said cover is in closed position.

3. The combination defined in claim 1 wherein said cover carries obstructing means that is separate and spaced from said locking means and arranged to be disposed when said cover is in closed position in a position intermediate the two usual positions that a toggle member of a toggle switch occupies, whereby when operatively associated with a toggle switch it is impossible to snap the toggle member as long as said cover is in closed position.

4. The combination defined in claim 3 wherein said obstructing means comprises an elongated member that is rigidly secured to said cover.

5. The combination of: a wall mounted selectively manually actuated electrical switch having a switch operating member extending through an associated standard face plate so as to be accessible for actuation; an attachment for selectively rendering said switch operating member inaccessible for actuation; said attachment comprising a mounting member in the form of a plate and a cover in the form of an open-sided box-like structure pivotally secured at one end to one end of said mounting member; said mounting member being rigidly mounted parallel to and contiguous with said face plate by standard face plate securing means that extend through openings in said mounting member and the usual openings in said face plate and are anchored in said switch; said mounting member having an opening through which said switch operating member extends; said cover being pivotal relative to said mounting member, said face plate and said switch operating member and positioned relative thereto so as to be pivoted between an open and a closed position wherein said switch operating member is covered thereby and rendered inaccessible; said mounting member having a locking lug bent out of its other end and disposed to extend inwardly of said cover when the latter is in closed position; and locking means carried by and at the other end of the cover arranged to cooperate with said locking lug to permit selective locking of said cover in its closed position.

References Cited in the file of this patent

UNITED STATES PATENTS

| | | |
|---|---|---|
| 2,169,860 | Von Hoorn | Aug. 15, 1939 |
| 2,439,708 | Abraham | Apr. 13, 1948 |
| 2,822,451 | Holmes | Feb. 4, 1958 |
| 2,830,143 | Koopman | Apr. 8, 1958 |

FOREIGN PATENTS

| | | |
|---|---|---|
| 463,460 | Great Britain | Mar. 31, 1937 |